J. R. FITZHUGH.
ICE CREAM FREEZER.
APPLICATION FILED JAN. 8, 1908.
910,522.
Patented Jan. 26, 1909.
2 SHEETS—SHEET 1.
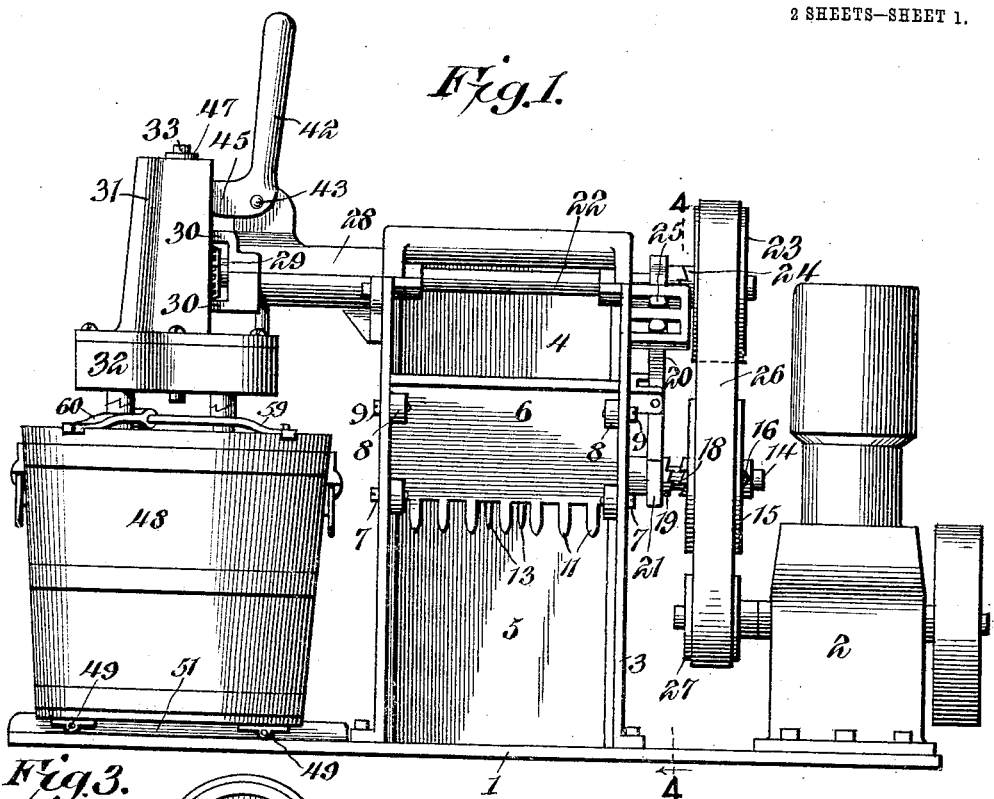
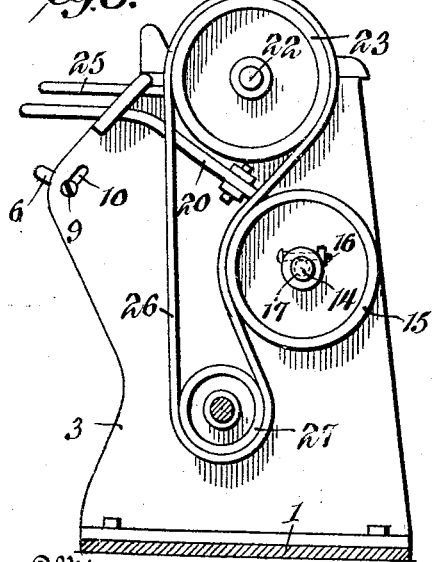
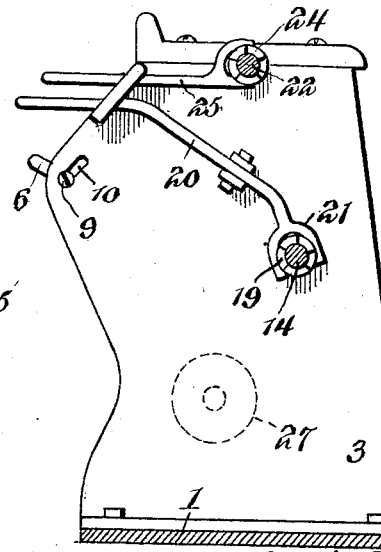
Witnesses
Inventor
Jacob R. Fitzhugh
By Sullivan J. Johnson
Attorney J. R. FITZHUGH.
ICE CREAM FREEZER.
APPLICATION FILED JAN. 8, 1908.
910,522.
Patented Jan. 26, 1909.
2 SHEETS—SHEET 2.
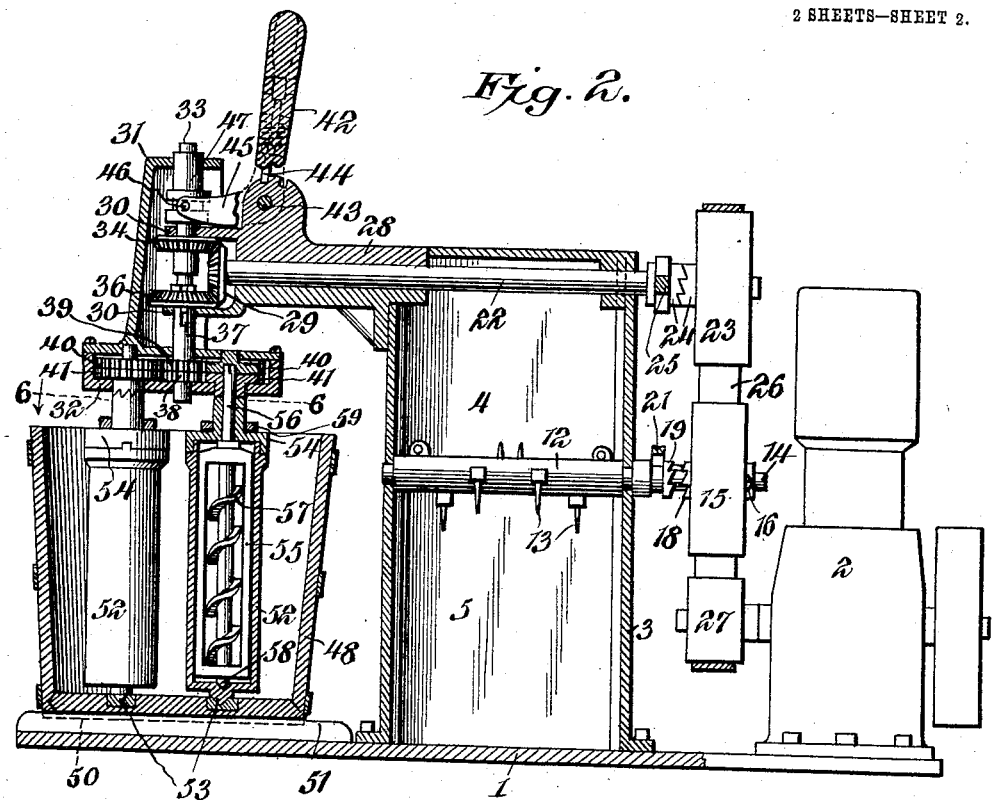
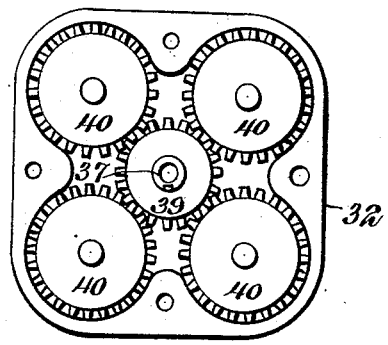
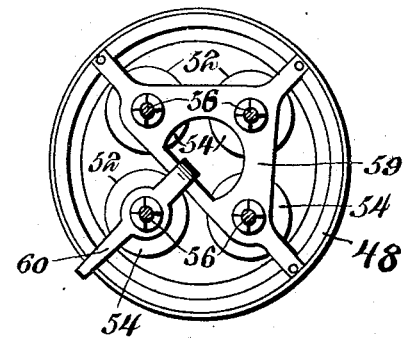
Witnesses
H. B. Johnson
Frank G. Brereton
Jacob R. Fitzhugh
Inventor
By Sullivan Johnson
Attorney

UNITED STATES PATENT OFFICE.

JACOB R. FITZHUGH, OF BRIDGETON, NEW JERSEY.

ICE-CREAM FREEZER.

No. 910,522.　　　Specification of Letters Patent.　　　Patented Jan. 26, 1909.

Application filed January 8, 1908.　Serial No. 409,792.

*To all whom it may concern:*

Be it known that I, JACOB R. FITZHUGH, a citizen of the United States, residing at Bridgeton, in the county of Cumberland and State of New Jersey, have invented certain new and useful Improvements in Ice-Cream Freezers, of which the following is a specification.

The particular object of the present invention is to provide simple, novel and effective means for producing ice cream in quantities and simultaneously manufacturing the same in several flavors, together with novel mechanism for affording an abundant supply of cracked ice to be used in connection with the freezing operation.

In the drawings, Figure 1 is a side elevation of the apparatus, as preferably constructed; Fig. 2 is a vertical sectional view through the same; Fig. 3 is an end elevation with the engine or motor removed; Fig. 4 is a sectional view on the line 4—4 of Fig. 1; Fig. 5 is a plan view of the cage and gearing with the top removed; and Fig. 6 is a sectional view substantially on the line 6—6 of Fig. 2.

The same reference numerals for corresponding parts are employed throughout the several figures of the drawings.

A base 1 is employed which is of cast iron or other suitable material and forms a support for the entire apparatus. On one end of the base is a suitable motor. In the present form of construction the conventional outline of an explosive motor 2 is shown, but it is to be understood that any sort of driving means may be utilized. Located adjacent to this motor is an ice crusher, the same comprising a casing 3 divided into upper and lower compartments 4 and 5 by an intermediate concave 6. The fronts of these compartments are open, as shown in Fig. 1 and the concave, which is set at an inclination, is pivotally mounted at its inner and lower end by suitable pivot screws or other devices 7. The outer and upper end has depending projections 8 into which are threaded holding screws 9. These screws, as shown in Fig. 4, pass through slots 10 in the sides of the casing, and thus the concave can be adjusted and held in different positions. The inner end of the concave has spaced teeth 11, and a rotary drum 12 is provided with projecting teeth 13 that operate between the teeth 11. The drum is journaled in the casing adjacent to and preferably slightly above the inner end of the concave. It has a projecting shaft 14 on which is loosely mounted a pulley 15. This pulley has a bolt 16, through its hub that operates in a groove 17 formed in the shaft. Consequently, while the pulley can rotate on the shaft, it is held against detachment therefrom. The inner end of the hub of the pulley has a clutch member 18 with which another clutch member 19 coöperates, the member 19 being feathered on the shaft 14 and movable into and out of engagement with the member 18. It is operated by a suitable lever 20 having a yoke 21 at its inner end engaged with the member 19.

Another shaft 22 is rotatably mounted in the upper end of the casing and carries a similar loose pulley 23 on one end. Co-acting clutch members 24, mounted respectively on the pulley 23 and shaft 22, form means for securing the pulley to the shaft, the movable clutch member being operated by a lever 25. The shaft 22 and the pulleys 15 and 23 are operated by a suitable belt or other driving connection 26 that passes around a pulley 27 on the motor shaft and engages the pulleys 15 and 23.

The shaft 22 extends through an arm 28 projecting from one side of the casing 3 and has a bevel gear wheel 29 located between a pair of spaced journal ears 30 on the arm 28. A housing 31 incloses the ears 30 and is provided at its lower end with a cage 32 formed of sections detachably secured together. An upright shaft 33 is journaled in the housing 31 and ears 30, and a gear wheel 34 feathered on the shaft, is engaged with the upper side of the gear wheel 29. Another gear wheel 36 engaged with the lower side of the gear wheel 29, is feathered to a sleeve 37 rotatably mounted on the shaft 33. Thus it will be seen that the shaft 33 and sleeve 37 will revolve in opposite directions, and said sleeve and shaft can move vertically with respect to the gear wheels 34 and 36.

The lower ends of the shaft and sleeve carry, respectively, master gears 38 and 39, located in the cage 32 and meshing respectively with a plurality of sets of upper and lower gear wheels 40 and 41. The gear wheels 40 have central angular sockets in their under sides. The gear wheels 41 have hubs depending through the cage and provided with teeth. The housing 31 with the gears last described and the shaft and sleeve are vertically movable and are operated by a bell crank lever 42 fulcrumed between its ends as shown at 43 on the arm 28. This lever has a suitable dog 44 for holding it in different positions and its lower arm is in the form of a yoke 45 having pins 46 engaged in the groove of a collar 47 fixed to the shaft 33. By swinging the lever 42 it will be evident that the parts may be raised and lowered and can be locked in their upper and lower positions.

A tub 48 for holding the ice and cans is movably mounted on the base 1 having rollers 49 running thereon and having a strip 50 operating in a guide 51 that prevents lateral displacement of the tub. Cans 52, four in number, have bearings 53 in the bottom of the tub and are provided with covers 54 having teeth that interlock with the teeth of the gear wheel 41. Scrapers or paddles 55 have shafts 56 that pass through the covers and are provided with angular upper ends engaging in the sockets of the gear wheels 40. Worms 57 are located within the paddles and have angular lower ends 58 engaged in similar sockets in the bottoms of the cans. The various cans are positioned by a frame 59, shown in Fig. 6 detachably secured to the top of the tub and having the hubs of the covers rotatable therein. The frame includes one swinging arm 60, which will permit the ready examination of one can without disturbing any of the others.

In using the apparatus, the ice is placed in the upper compartment 4 and it can be readily crushed by clutching the wheel 15 to the cylinder, the crushed ice falling into the compartment 5 from which it may be shoveled into the tub. When ice is not wanted, the crusher can be unclutched. To set the freezer in operation, it is only necessary to clutch the pulley 23 to the shaft 22. To remove and replace the tub with the cans therein, all that is necessary is to raise the housing 31, which will carry the gear wheels 40 and 41 upwardly and disconnect them from the covers 54 and shafts 56. This apparatus is particularly useful for freezing ice cream or analogous material in considerable quantities and allows various flavors to be simultaneously frozen.

It will, of course, be understood that slight changes may be made in the details of construction without departing from the spirit of the invention.

Having thus described my invention, what I claim as new and desire to secure by Letters Patent, is:—

The combination with a base, of a tub movably mounted thereon, a plurality of rotatable cans located in the tub, stirring mechanisms rotatable in the cans, a vertically movable housing having a cage at its lower end, a lever for raising and lowering the housing, a driving shaft, a vertical shaft and a sleeve loosely mounted on said shaft in the housing and having gears driven from the driving shaft, master gears connected to the sleeve and shaft and located in the cage, a plurality of sets of gears in the cage engaged with the master gears, and means detachably connecting the gears with the cans and stirring mechanisms.

In testimony whereof I affix my signature in presence of two witnesses.

JACOB R. FITZHUGH.

Witnesses:
 ALLEN M. LOVELAND,
 DAVID S. LOVELAND.